(12) United States Patent
Adler

(10) Patent No.: US 9,691,046 B1
(45) Date of Patent: Jun. 27, 2017

(54) SYSTEM AND METHOD FOR RISK ANALYZED PROGRAM PLANNING (RAPP)

(71) Applicant: Joel Adler, Conshohocken, PA (US)

(72) Inventor: Joel Adler, Conshohocken, PA (US)

(*) Notice: Subject to any disclaimer, the term of this patent is extended or adjusted under 35 U.S.C. 154(b) by 160 days.

(21) Appl. No.: 14/595,090

(22) Filed: Jan. 12, 2015

Related U.S. Application Data

(60) Provisional application No. 61/926,782, filed on Jan. 13, 2014, provisional application No. 62/007,539, filed on Jun. 4, 2014.

(51) Int. Cl.
*G06Q 40/00* (2012.01)
*G06Q 10/06* (2012.01)

(52) U.S. Cl.
CPC ... *G06Q 10/0635* (2013.01); *G06Q 10/06393* (2013.01)

(58) Field of Classification Search
None
See application file for complete search history.

(56) References Cited

U.S. PATENT DOCUMENTS

| | | | | |
|---|---|---|---|---|
| 7,599,870 B2* | 10/2009 | Merkoulovitch | .. G06Q 10/0635 | 703/2 |
| 8,370,245 B2* | 2/2013 | Gunther | ................. G06Q 40/06 | 705/35 |
| 8,527,316 B2* | 9/2013 | Cogliandro | ............ G06Q 10/04 | 705/7.28 |
| 8,862,448 B2* | 10/2014 | Holmes | ............... G06F 19/3493 | 702/19 |
| 9,306,811 B2* | 4/2016 | Watts | ..................... G01W 1/00 |
| 2003/0101122 A1* | 5/2003 | Merkoulovitch | ...... G06Q 40/06 | 705/36 R |
| 2004/0111351 A1* | 6/2004 | Ikeda | .................... G06Q 10/10 | 705/36 R |

(Continued)

FOREIGN PATENT DOCUMENTS

WO    WO 2012107933 A1    8/2012

OTHER PUBLICATIONS

George Wright & George Cairns, Scenario Thinking, 2011, ISBN 978-0-230-27156-2, pp. 1-17, 132-141, Palgrave Macmillan, UK.

(Continued)

*Primary Examiner* — Sunit Pandya

(57) ABSTRACT

A planning method that supports go/no-go decisions to launch or continue transformative programs that typically have durations of several years to achieve desired outcomes. Examples include organizational centralization and decentralization, process improvement, continuous improvement, Agile Management and Enterprise Resource Management. A multi-step method provides a seamless path from human judgments regarding desired outcomes and their associated accomplishments, obstacles and risk factors, to financial risk assessments for achieving those desired outcomes. The methods use of Project and Project Risk management technology provides a seamless path to more detailed granularity required for project management of program implementations as well as a return to less granularity to repeat earlier steps of the multistep method, to reassess program progress. Techniques from several planning disciplines including, Project Management, Project Risk Management, Scenario Planning, Financial Modeling, and most notably Backcasting are used.

19 Claims, 13 Drawing Sheets

(56) References Cited

U.S. PATENT DOCUMENTS

| | | | |
|---|---|---|---|
| 2005/0197879 A1* | 9/2005 | Judy | G06Q 10/06 705/7.12 |
| 2006/0085325 A1* | 4/2006 | Jammal | G06Q 40/025 705/38 |
| 2009/0216588 A1* | 8/2009 | Coyne | G06Q 10/063 705/7.11 |
| 2011/0153536 A1* | 6/2011 | Yang | G06F 17/18 706/47 |
| 2014/0200953 A1* | 7/2014 | Mun | G06Q 10/04 705/7.28 |

OTHER PUBLICATIONS

Mats Lingren & Hans Bandhold, Scenario Planning, 2003, ISBN-13:978-0-230-57919-4, pp. 22-46, Palgrave Macmillan, New York.

Project Management Institute (PMI), Project Management Body of Knowledge, Fifth Edition, 2013, ISBN-978-1-935589-67-9, pp. 125-132,149-160, PMI, Newtown Square, PA.

David Hulett, Integrated Cost-Schedule Risk Analysis, 2011, ISBN 978-0-566-09166-7, pp. 1-14, 33-48, Gower, Burlington VT, USA.

Paul Hopkin, Fundamentals of Risk Management, 2010, ISBN-13:978-0-7494-5942-0, pp. 152-159, 233-237, 307-316, IRM, London UK.

Project Management Institute (PMI), Practice Standard for Project Risk Management, 2009. ISBN: 978-1-933890-38-8, pp. 9-12, 31-42, PMI, Newtown Square, PA.

Cliff T. Ragsdale, Spreadsheet Modeling & Decision Analysis, 2008, ISBN 0-324-65664-5, pp. 559-584, Thomson South-Western, Mason, OH USA.

Andrei Borshchev, The Big Book of Simulation, 2013, ISBN 13:978-0-9895731-7-7, pp. 34-50, 240-243, AnyLogic NorthAmerica, USA.

Larry Hirschhorn, Backcasting, A Systematic Method for Creating a Picture of the Future and How to Get There, OD Practitioner, 2007, p. 16-23 vol. 39 No. 4,Pelham,NY:The network.

Thomas Hill & Pavel Lewicky, Statistics Methods and Applications, ISBN1-884233-59-7, pp. 165-177, StatSoft, Tulsa OK, USA.

Harold Bierman Jr. & Seymour Smidt, The Capital Budgeting Decision, Ninth Edition, 2007, ISBN13: 978-0-415-40003-9 pp. 48-52, Routledge, New York, NY.

Howard Raiffa, Decision Analysis, Introductory lectures on Choices under Uncertainty, 1968, pp. 10-27, Addison-Wesley, Reading, MA.

* cited by examiner

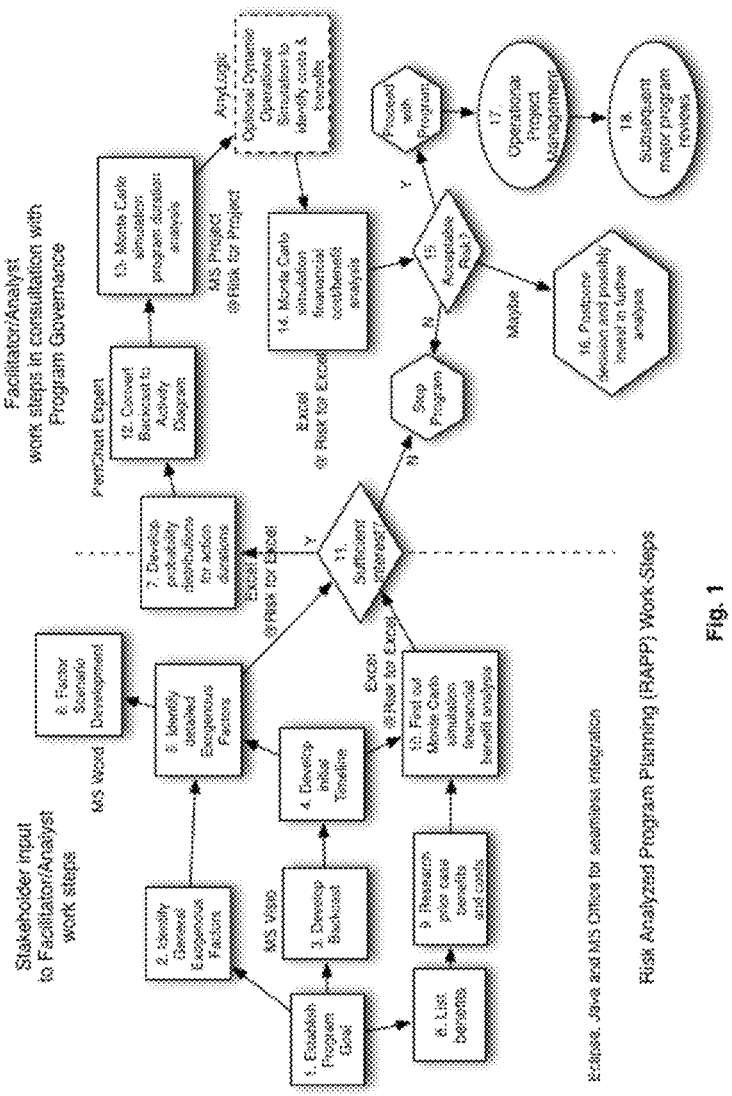

Fig. 2     STEPS WITHIN RAPP

1. Establish Program Goal
2. Identify General Exogenous Factors
3. Develop Backcast
4. Develop initial time line
5. Identify detailed exogenous Factors
6. Factor Scenario Development
7. Develop probability distributions for action durations
8. List benefits
9. Research prior case benefits
Optional Dynamic Operational Simulation to identify benefits
10. Monte Carlo simulation financial benefit analysis
11. Sufficient Interest?
12. Convert Backcast to Activity Diagram
13- Monte Carlo simulation program duration analysis
Optional Dynamic Operational Simulation to identify costs & benefits
14. Monte Carlo simulation financial cost/benefit analysis
15. Acceptable Risk?
16. Postpone decision and possibly invest in further analysis
17. Operational Project Management
18. Subsequent major program review

Fig. 3    Information Development and Flow for RAPP steps

| From Step \ To Step | 1 | 2 | 3 | 4 | 5 | 6 | 7 | 8 | 9 | 10 | 11 | 12 | 13 | SIM | 14 | 15 | 16 | 17 | 18 | Update type |
|---|---|---|---|---|---|---|---|---|---|---|---|---|---|---|---|---|---|---|---|---|
| 1 | A | ✓ | ✓ | | | | | | | | | | | | | | | | ✓ | Type 1 |
| 2 | | A | | | | | | | | | | | | | | | | | ✓ | Type 2 |
| 3 | | | CAB | ✓ | | | | | | | | | | | | | | | ✓ | Type 1 |
| 4 | | | | B | ✓ | ✓ | ✓ | | | | | | | | | | | | | Type 1 |
| 5 | | | | | A | ✓ | ✓ | | | | | | | | | | | | ✓ | Type 2 |
| 6 | | | | | | A | ✓ | | | | | | | | | | | | ✓ | Type 2 |
| 7 | | | | | | | B | | ✓ | ✓ | | ✓ | | | | | | | ✓ | Type 1 |
| 8 | | | | | | | | A | ✓ | B | ✓ | | | | | | | | ✓ | Type 2 |
| 9 | | | | | | | | | AB | | ✓ | | | | | | | | | Type 2 |
| 10 | | | | | | | | | | | AF | ✓ | | | | | | | | Type 2 |
| 11 | | | | | | | | | | | | BC | ✓ | | | | | | | Type 2 |
| 12 | | | | | | | | | | | | | BA | ✓ | | | | | | Type 2 |
| 13 | | | | | | | | | | | | | | B | ✓ | | | | | Type 2 |
| 14 | | | | | | | | | | | | | | | B | ✓ | ✓ | | | Type 2 |
| 15 | | | | | | | | | | | | | | | | AF | ✓ | | ✓ | Type 2 |
| 16 | | | | | | | | | | | | | | | | | A | ✓ | ✓ | Type 2 |
| 17 | | | | | | | | | | | | | | | | | | AB | ✓ | N/A |
| 18 | ✓ | | | | | | | | | | | | | | | | | | AB | Type 2 |

LEGEND
A. Text Capture/Retention
B. Data Capture/Retention
C. Image Capture/Retention
✓: Information flow to subsequent steps
F. Flow Decision UPDATING PRIVILEGE NOTES
Type 1:  Backcaster facilitates the backcasting process
Type 2:  Analyst facilitates, analyzes and conducts remaining steps
N/A:  Not applicable because control is not within the RAPP process

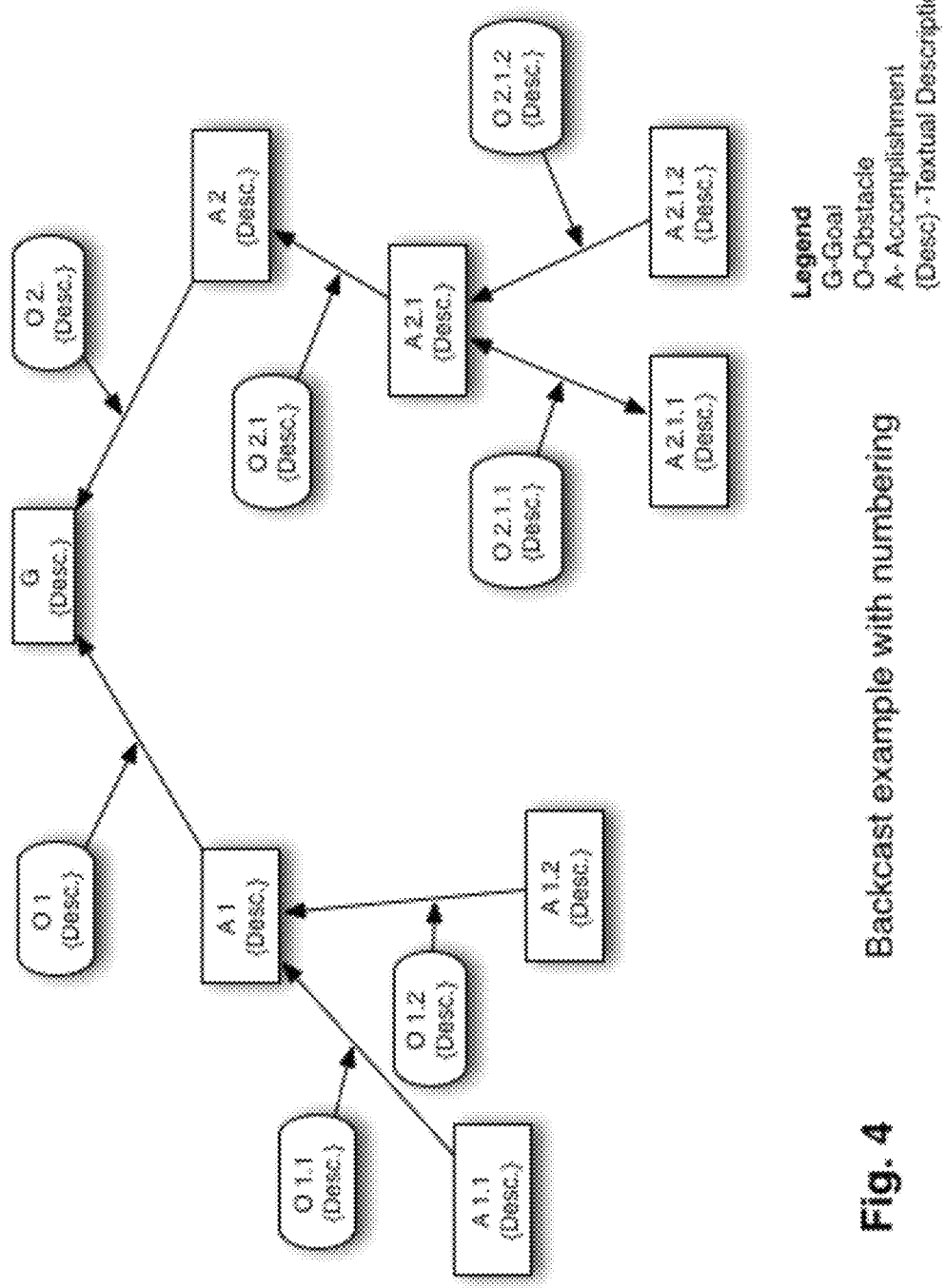
Fig. 4 Backcast example with numbering

Nurse Action Plan revised, see Figure 4 in reference 5

Fig. 9a Activity and milestone table for example in Fig. 10

| Activity/milestone Number in Fig. 10 | Activity/task milestone Label | Predecessor | Estimated duration | Estimated start | Estimated finish | Duration Probability Distribution & Parameters |
|---|---|---|---|---|---|---|
| Start | | | 0 | | | None |
| 1 | T1 A2.1.1 | Start | TBD1 | TBD1 | TBD1 | TBD2 |
| 2 | T1 A2.1.1 | 1 | TBD1 | TBD1 | TBD1 | TBD2 |
| 3 | T2 A2.1.2 | 1 | TBD1 | TBD1 | TBD1 | TBD2 |
| 4 | T1 A1.2 | Start | TBD1 | TBD1 | TBD1 | TBD2 |
| 5 | T2 A1.2 | Start | TBD1 | TBD1 | TBD1 | TBD2 |
| 6 | T1 A2.1 | Start | TBD1 | TBD1 | TBD1 | TBD2 |
| 7 | A2.1.2 | 3 | 0 | | | None |
| 8 | A2.1.1 | 2 | 0 | | | None |
| 9 | T1 A2 | 4 | TBD1 | TBD1 | TBD1 | TBD2 |
| 10 | T1 A1.1 | Start | TBD1 | TBD1 | TBD1 | TBD2 |
| 11 | A1.2 | 4, 5 | 0 | | | None |
| 12 | A2.1 | 6, 7, 8 | 0 | | | None |
| 13 | A1.1 | 10 | 0 | | | None |
| 14 | T2 A1 | 9 | TBD1 | TBD1 | TBD1 | TBD2 |
| 15 | T1 A2 | Start | TBD1 | TBD1 | TBD1 | TBD2 |
| 16 | A1 | 11, 13, 14 | 0 | | | None |
| 17 | A2 | 12, 15 | 0 | | | None |
| 18 | T1 G | Start | TBD1 | TBD1 | TBD1 | TBD2 |
| 19 | G | 16, 17, 18 | 0 | | | None |
| Finish | | 19 | TBD1 | | | None |

Legend
TBD = To be determined
TBD1 = Estimated duration, start and finish determined in Step 4 (Develop Initial Timeline) of Figure 1
TBD2 = Probability distribution determined in Step 7 of Figure 1

Fig. 9b

Activity Cost-Benefit Estimate Input and calculation table generated in step 10 for example in Fig. 10

| Activity/ milestone Number in Fig. 10 | 1 Development Duration months | 2 Monthly Run-cost (RC) | 3 Fixed cost | 4 Total Devel cost | 5 Total Program duration months | 6 Benefit Duration months | 7 Monthly program benefit | 8 Total Program Benefit | 9 Financial Metric e.g NPV IRR ROI |
|---|---|---|---|---|---|---|---|---|---|
| Totals | ISV | | | ISV | ISV | CSV | RAN | CRAN | CRAN |

Legend
ISV-Input Single Value
RAN-Random Variable
CSV-Calculated Single value
CRAN-Calculated Random Variable

Fig. 9c
Activity Cost-Benefit Estimate Input and calculation table generated in step 14 for example in Fig. 10

| Activity/milestone Number in Fig. 10 | 1 Development Duration months | 2 Monthly Run-cost (RC) | 3 Fixed cost | 4 Total Activity cost | 5 Total Program duration months | 6 Benefit Duration months | 7 Monthly program benefit | 8 Total Program Benefit | 9 Finan. Metrics e.g. IRR NPV |
|---|---|---|---|---|---|---|---|---|---|
| Start | 0 | 0 | 0 | 0 | | | | | |
| 1 | RAN | RAN | RAN | CRAN 1 | | | | | |
| 2 | RAN | RAN | RAN | CRAN 1 | | | | | |
| 3 | RAN | RAN | RAN | CRAN 1 | | | | | |
| 4 | RAN | RAN | RAN | CRAN 1 | | | | | |
| 5 | RAN | RAN | RAN | CRAN 1 | | | | | |
| 6 | RAN | RAN | RAN | CRAN 1 | | | | | |
| 7 | 0 | 0 | 0 | 0 | | | | | |
| 8 | 0 | 0 | 0 | 0 | | | | | |
| 9 | RAN | RAN | RAN | CRAN 1 | | | | | |
| 10 | RAN | RAN | RAN | CRAN 1 | | | | | |
| 11 | 0 | 0 | 0 | 0 | | | | | |
| 12 | 0 | 0 | 0 | 0 | | | | | |
| 13 | 0 | 0 | 0 | 0 | | | | | |
| 14 | RAN | RAN | RAN | CRAN 1 | | | | | |
| 15 | RAN | RAN | RAN | CRAN 1 | | | | | |
| 16 | 0 | 0 | 0 | 0 | | | | | |
| 17 | 0 | 0 | 0 | 0 | | | | | |
| 18 | RAN | RAN | RAN | CRAN 1 | | | | | |
| 19 | 0 | 0 | 0 | 0 | | | | | |
| Finish | 0 | 0 | 0 | 0 | | | | | |
| Totals | RAN | | | CRAN 2 | ISV | CRAN 3 | RAN | CRAN 4 | CRAN 5 |

Legend
ISV-Input Single Value
RAN-Random Variable
CSV-Calculated Single Value
CRAN-Calculated Random Variable Conversion to Activity Network Diagram

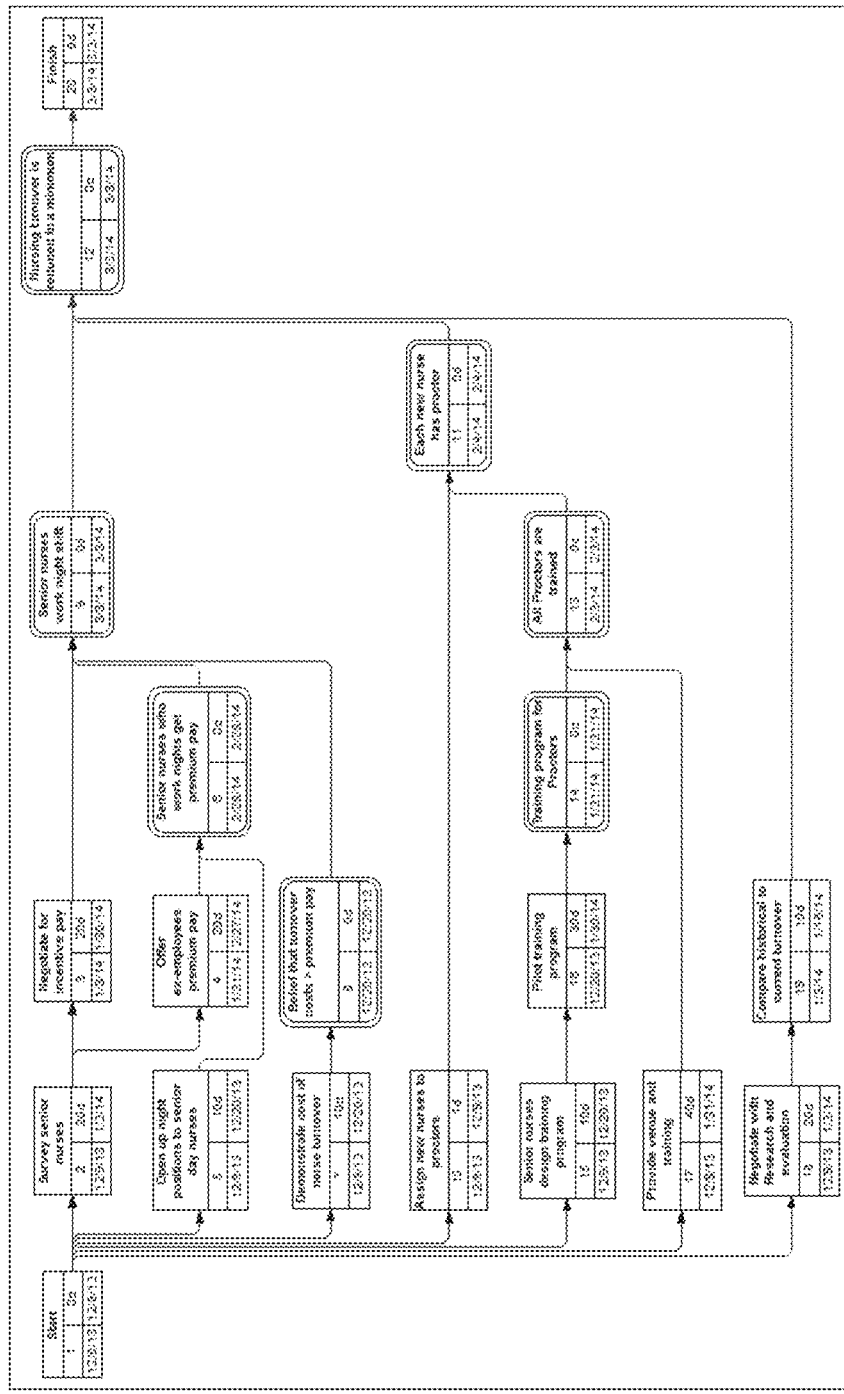
Fig. 11 Activity Network Diagram of reference 5 captured in Pert Chart Expert Project Management Software

SYSTEM AND METHOD FOR RISK ANALYZED PROGRAM PLANNING (RAPP)

CROSS REFERENCE TO RELATED APPLICATIONS

This application claims benefit of U.S. Provisional Application No. 61/926,782 filed Jan. 13, 2014 and of U.S. Provisional Application No. 62/007,539 filed Jun. 4, 2014. The contents of these applications are hereby incorporated by reference in their entireties.

FIELD OF THE INVENTION

This invention concerns an improved planning method to support go/no-go decisions to launch or continue change initiatives that typically have durations of several (e.g., four to six) years.

BACKGROUND OF THE INVENTION

Change Programs are essential but often fail to deliver planned benefits. 70% of business process reengineering (BPR), 60% of process improvement (Lean 6 Sigma), and 70% of Business Transformation Initiatives are reported to have failed outright or not met initial expectations. The failures of programs are well documented. They include many organizational transformation initiatives such as Enterprise Resource Planning (ERP) deployments as well as public policy initiatives such as the Affordable Health Care Act in the United States that experienced numerous unintended negative consequences. Whereas go/no-go analysis is well developed for "projects," it is largely absent for "programs." The distinction between projects and programs is that projects produce deliverables whereas programs produce outcomes. Producing outcomes typically requires a number of deliverables. Consequently, programs typically will consist of a number of coordinated projects that support achieving a singular goal that may span several (e.g. 4 to 6) years to achieve.

Program planning is a challenge because this passage of time tends to make programs more susceptible than projects to uncertainties in both their internal and external environments. These uncertainties are often beyond the control of the enterprise (exogenous factors). Furthermore, a program has a hard to define end-point. Therefore, the success of a program is difficult to evaluate because outcomes are not immediately observable and outcome metrics are hard to generate. Finally, because program planning lacks seamless transitions to Project Management controls, programs appear less governable and actionable. Consequently, thorough planning for change initiatives given numerous exogenous factors and the absence of outcome metrics as well as no familiar project management controls appears to be very difficult. This appearance of difficulty often results in major change programs that are launched based primarily on intuition and/or personal convictions. This invention (RAPP) will replace intuition and conviction with more careful logical scrutiny and analysis.

The discipline of Project Risk Management first identifies and then avoids, mitigates, transfers or accepts project risk, i.e. the risk to achieving deliverables as opposed to outcomes. Project Risk Management can be viewed as effort invested in exposing "known unknowns" and locally "unknown knowns" to scrutiny, in an effort to limit their impact. Program Planning lacks such a risk management methodology with the result that change programs are often launched without the benefit of exposing known unknowns.

Prior art in Program Risk Management is largely undeveloped. What little is available mimics risk identification practices for Project Risk Management which focus more on shorter term planning horizons with more emphasis on controllable (endogenous) than uncontrollable (exogenous) risk factors or influences. For example, the duration of change programs is too lengthy to allow for the accurate estimates of resource requirements.

Consideration of exogenous factors requires a significant element of progressive elicitation of expert opinions and judgments. Therefore, Program Risk Management requires both expert judgment and analytics. Additionally, the prior art focuses on already launched programs and/or does not directly support go/no-go decisions on launching new programs. The examples below illustrate these points and are divided into two groupings.

Proprietary Prior Art Approaches

Kotter 8-Step Process for Change

This popular practice for program management emphasizes qualitative behavioral change management guidelines such as "Establishing a Sense of Urgency," "Developing a Change Vision," "Communicating the Vision" and "Incorporating Changes into the Culture". Such guidelines are useful only after programs are launched and provide no basis for making a go/no go decision to launch a specific program.

U.S. Pat. No. 8,527,316 B2

This patent application is focused on alignment of the program with the strategic intent of the firm. Its presumption is that programs fail because there is no such alignment. There is no focus on developing a basis for making go/no-go decisions for launching programs.

United States Patent Application US 2005/0197879 A1

This patent application deals primarily with active program management and recommends that operational metrics such as schedules, resources and budgets be carefully tracked. This is a clear extension of shorter project management planning horizons where this level of detail is available. Consequently, this invention has no utility for go/no-go decisions for launching programs where this level of detail is unavailable.

International Patent Application WO 2012107933 A1

This patent application applies to risk management for organizational entities as opposed to specific programs. Therefore it has no utility for go/no-go decisions for launching specific programs.

General Prior Art Planning Methods

Scenario Planning

Scenario planning focuses primarily on the exogenous factors or influences that might impact the mission, strategy and structure of an enterprise. Scenarios typically do not analyze specific change programs that would adapt the enterprise to a given scenario. Scenario driven strategy adjustments, however, may ultimately spawn consideration of a number of organizational change programs where RAPP would be useful. Therefore Scenario Planning has no immediate utility for supporting go/no-go decisions for launching specific programs. A description of scenario planning is provided by George Wright & George Cairns in *Scenario Thinking, Practical Approaches to the Future,* 2011, ISBN 978-0-230-27156-2, and by Mats Lindgren & Hans Bandhold in *Scenario Planning, the link between future and strategy,* 2003, ISBN-13:978-0-230-57919-4, and the content of which are incorporated herein by reference. incorporated herein by reference.

Project Management

Project Management techniques depend on the concept of Work Breakdown Structures (WBS) to which resource allocations can be made and scheduled. This level of detail is only known in the relatively short term often long after programs are initiated and therefore project management techniques alone are not appropriate to make program go/no-go decisions. A description of project management techniques is provided in *Project Management Body of Knowledge*, Fifth Edition, Project Management Institute, 2013, ISBN-978-1-935589-67-9, and is incorporated herein by reference.

Project Risk Management

Project Risk management is employed in support of Project Management and therefore also utilizes the concept of WBS to which resource allocations can be made and scheduled. This level of detail is only known in the relatively short term often long after programs are initiated and therefore project risk management techniques alone are not appropriate to make program go/no-go decisions. Project risk management techniques are described in *Integrated Cost-Schedule Risk Analysis*, David Hulett, 2011, ISBN 978-0-566-09166-7; *Fundamentals of Risk Management*, Paul Hopkin. 2010, ISBN-13: 978-0-7494-5942-0; and *Practice Standard for Project Risk Management*, Project Management Institute, 2009. ISBN: 978-1-933890-38-8, the context of which are incorporated herein by reference.

Financial Modeling & Decision Analysis

Financial modeling is a general technique that is not restricted to any specific usage application. Therefore, it alone does not have the inherent analytic specificity required to support making program go/no-go decisions. A description of such financial modeling may be found in *Spreadsheet Modeling & Decision Analysis*, Cliff T. Ragsdale, 2008, ISBN 0-324-65664-5, the contents of which are incorporated herein by reference.

Dynamic Simulation Modeling

Dynamic Simulation Modeling is a general technique that is not restricted to any specific usage application. Therefore, it alone does not have the inherent analytic specificity required to support making program go/no-go decisions. Dynamic simulation modeling is described, for example, by Borshchev in *The Big Book of Simulation*, 2013, ISBN 13: 978-0-9895731-7-7, the content of which are incorporated herein by reference.

Backcasting

"Backcasting is a systematic method for creating a picture of the future and how to get there." It is prior art that is particularly powerful for the progressive elicitation from domain experts of obstacles, achievements and actions required to reach program goals. RAPP utilizes backcasting as its qualitative planning element and integrates backcasting with the general prior art planning methods discussed above. Backcasting by itself lacks the quantitative elements needed to make go/no-go decisions for launching programs. Backcasting is described by Hirschhorn in *Backcasting, A systematic Method for Creating a Picture of the Future and How to Get There*, OD PRACTITIONER Vol. 39 No. 4, 2007, the contents of which are incorporated by reference.

Conclusions on Weaknesses of Current Program Planning Methods

As exemplified by the prior art cited above, current methods lack the capacity to balance qualitative judgment with quantitative metrics to make decisions to launch or continue change programs. Current methods also lack the capacity to seamlessly transition to more granular and detailed project management methods needed to actualize programs. Current methods further lack the capacity to consider exogenous factors and influences that come into play when considering change programs that may take several (e.g. 4 to 6) years to develop. The invention addresses these and other problems in the prior art.

SUMMARY OF THE INVENTION

The invention provides a system and method for risk analyzed program planning (RAPP) that supports go/no-go decisions to launch or continue change initiatives that typically have durations of several (e.g. four to six) years. For illustrative purposes some examples of programs that can be addressed with RAPP include:

Transitions to centralized management for current independent business units or decentralization of a centralized company into independent business units;

Adoption of Lean Six Sigma Continuous Improvement methodologies;

Outsourcing operations that do not distinguish the enterprise from competitors or in-sourcing operations to achieve high quality standards;

Transforming a medical practice from a fee for service to a fixed fee per patient business model;

A single payer system that replaces the private insurance industry in the United States;

A municipal land bank charged with converting abandoned property to productive use;

Property tax incentives to discourage flood plane construction;

Consolidation of regional hospital systems;

Consolidation of city agencies; and

Revision of tax codes.

RAPP bridges the planning horizon between very long-range scenario planning described, for example, by Wright and Cairns as well as Lindgren and Bandhold, used as a component of strategy development and the shorter more immediate planning horizon of project management that is concerned with the allocation of resources to produce deliverables within scope, schedule and budget.

RAPP combines and expands upon techniques from several of the prior art planning methods discussed above including, Project Management, Project Risk Management, Scenario Planning, Dynamic Simulation Modeling, Financial Modeling and most notably Backcasting.

The advantage of RAPP is that its use will reduce the likelihood of program failures. RAPP does this by uniquely combining the prior art planning methods as follows.

RAPP utilizes a prior art method for strategic planning called backcasting as developed by Hirschhorn. Backcasting is a participative process that includes major stakeholders in developing a program plan. This provides a substantial element of qualitative judgment into the decision process. RAPP also utilizes some of the techniques and software tools for project management and project risk management, most notably Monte Carlo simulation, to reflect the uncertainties presented by exogenous factors in reaching program go/no-go decisions. This provides quantitative metrics to balance with qualitative judgments on which to base go/no-go decisions on launching programs, thereby addressing the limitations noted in the background section above.

Tools for project management and project risk management also provide a seamless transition to the more granular and detailed project management methods needed to actualize programs because the very same tools are used to manage the multiple projects that comprise a program, thereby addressing the limitations noted in the background section above.

RAPP also utilizes some of the methods of scenario planning by requiring thorough analysis of driving forces (exogenous factors and influences) that may impact a program, thereby addressing the limitations noted in the background section above.

In exemplary embodiments, the invention includes a method and a computer readable device including instructions that, when processed, enable a computer to be used to plan programs having several year planning horizons to generate go/no-go decisions to launch, continue, or change such programs. In an exemplary embodiment, the method includes the steps of using backcasting to solicit input from stakeholders to identify program goals, obstacles, achievements and the actions required to realize the achievements for the program; placing each action for the achievements into a project activity network diagram; estimating the durations of the actions, where the durations are treated as random variables with probability distributions based on a determination of exogenous factors and influences that impact action durations; performing Monte Carlo simulations on a processing device for durations of the activity network diagram as well as costs and benefits that are also treated as random variables in order to generate quantitative financial metrics as random variables with probability distributions; processing the metrics to determine confidence levels for performance levels; and generating a go/no-go decision for the program based on the confidence levels. The go/no-go decision may include determining whether the program should proceed, be postponed for future consideration, or be cancelled.

In the exemplary embodiments, the backcasting results in an activity sequence required to complete the program, estimates the duration and timing of the activities to complete the program, solicits input from stakeholders to identify the factors that may influence the duration of each activity of the program and the probability distributions and the parameters of each of the factors that may influence the duration and costs of each activity of the program, estimates the development costs of each activity of the program, and/or estimates the benefits of the total program.

The method may also include the steps of calculating durations and time-lines for the activities of the program and solicits input from stakeholders for use in identifying the probability distributions for activity durations. The activities may also be converted into a project activity network diagram format that is recognized by project management software.

In the exemplary embodiment, the Monte Carlo simulation work-steps includes performing a Monte Carlo simulation on the project activity network diagram utilizing the probability distributions for activity durations to compute a probability distribution for a duration of the entire program and performing a financial Monte Carlo simulation on cost and benefits of the program utilizing the probability distribution for the duration of the entire program, each step of the activity sequence, and other costs and benefits unrelated to duration to compute a probability distribution for Internal Rate of Return (IRR) and Net Present Value (NPV).

Because activity network diagrams are used at the program management level, RAPP also provides a seamless transition to more granular and detailed Work Breakdown Structures needed to manage the multiple projects of a program. As will be apparent from the following detailed description, RAPP is also designed for use in cooperation with a computer having memory and captures textual, numerical data, and image information.

BRIEF DESCRIPTION OF THE DRAWINGS

A method for Risk Analyzed Program Planning (RAPP) is further described below with reference to the accompanying drawings, in which:

FIG. 1 illustrates the overall RAPP method including system flow for all eighteen (18) RAPP work-steps.

FIG. 2 lists the 18 work-steps within RAPP and serves as a partial legend for FIG. 3.

FIG. 3 illustrates how information is developed and flows for the 18 RAPP work-steps.

FIG. 4 illustrates the backcast numbering protocol.

FIG. 9a illustrates the activity and milestone table developed in work-steps 3, 4 and 7 for the action plan shown in FIG. 7.

FIG. 9b illustrates how a metric is generated for financial benefit assessment in work-step 10.

FIG. 9c illustrates how a metric is generated for financial cost/benefit assessment in work-step 14.

FIG. 11 illustrates the activity network diagram presented by Hirschhorn in *Backcasting, A systematic Method for Creating a Picture of the Future and How to Get There*, OD PRACTITIONER, Vol. 39, No. 4, 2007.

DETAILED DESCRIPTION OF ILLUSTRATIVE EMBODIMENTS

Figure 5:
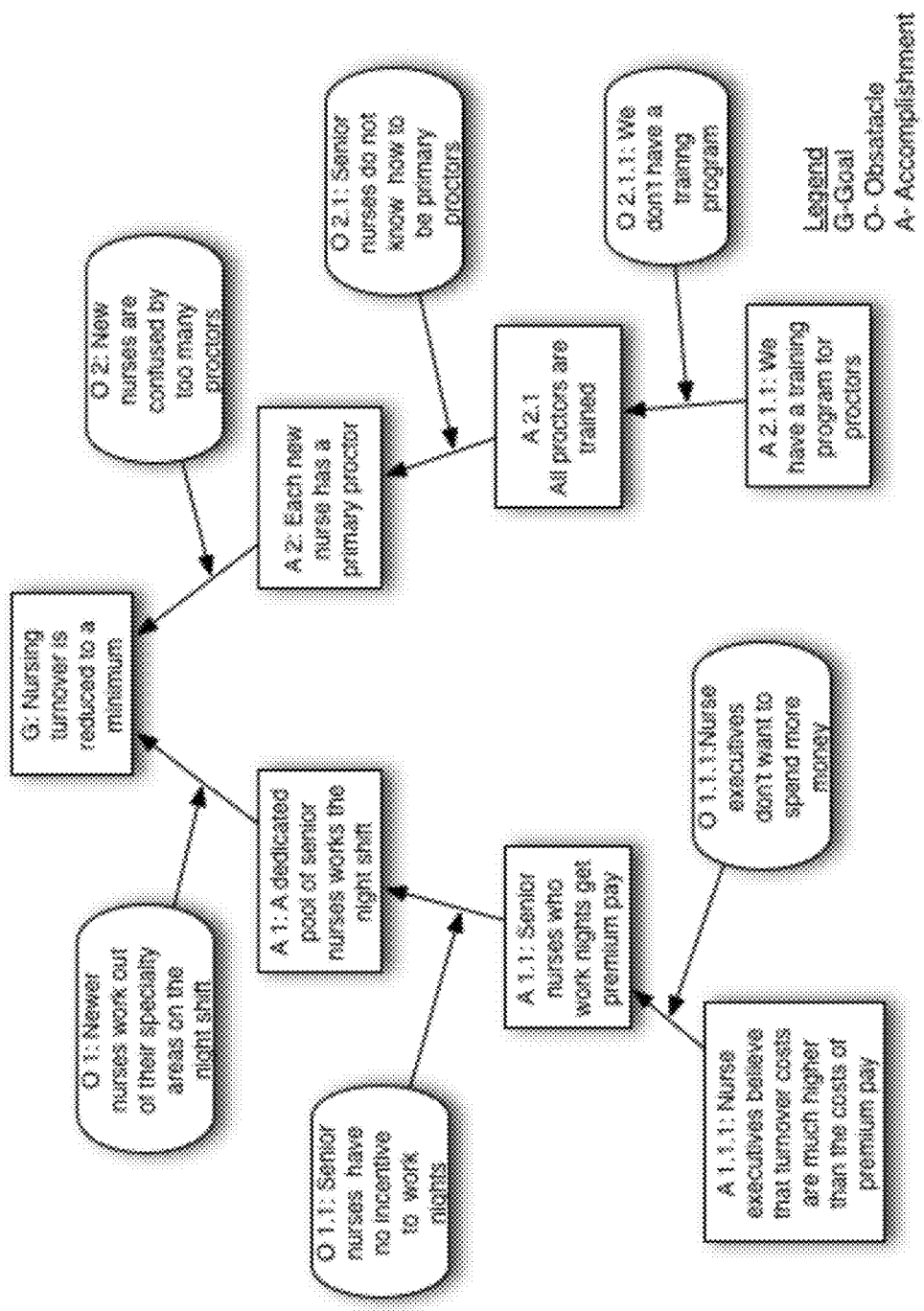
FIG. 5 illustrates the backcast presented by Hirschhorn in *Backcasting, A systematic Method for Creating a Picture of the Future and How to Get There*, OD PRACTITIONER, Vol. 39, No. 4, 2007.

A particular embodiment of the invention is described below in detail and is intended to incorporate all alternatives, modifications and equivalents as to implementation on particular choices of computing hardware, software, or network platforms. The method and associated program storage device shown below can be implemented with a variety of appropriately functional procedural programming languages including C++, Visual Basic or Java, combined with any of a number of Integrated Development Environments (IDE's) such as Eclipse, Microsoft Visual Studio, and Oracle NetBeans IDE. The choice of operating systems and database management systems is open as well. The functionality can be deployed on single or networked workstations, distributed or centralized processors as well as remote servers. Such variations are intended to be covered by the claims defining the invention.

Of particular interest is the utilization of commercially available software for Dynamic Simulation, Word Processing, Diagramming, Spreadsheet analysis, Project Management, as well as Risk Analysis and Monte Carlo Simulation that interface with Spread Sheet and Project Management software. There are number of these packages commercially available.

A presently preferred implementation of the system of the invention utilizes the Windows operating system operating on an Intel Core Duo or greater chip. It utilizes AnyLogic, Eclipse, Java, Microsoft Word, Microsoft Visio, Microsoft Excel, Microsoft Project, Critical Tools Pert Chart Expert as well as Palisades @Risk for Excel and Project. Those skilled in the art will appreciate that other hardware and software configurations available on the market also may be used.

A computer implementing an embodiment of the system of the invention typically includes a variety of computer readable media as a program storage device. Such computer readable media can be any available media that can be accessed by computer and includes both volatile and non-volatile media, removable and non-removable media. By way of example, and not limitation, computer readable media may comprise computer storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by a computer.

General Description

RAPP is utilized for initial program planning and subsequent major program review points. FIG. 1 is a schematic of the flow sequence of work-steps involved with the RAPP methodology. Work-steps 1 to 16 comprise the RAPP system work-steps leading up to and including a program go/no-go decision. Work-steps 17-18 are work-steps taken between instances of the use of RAPP for a given change program.

Work is achieved through three participating groups, Stakeholders, Organizational Governance, and Facilitators/Analysts. Stakeholders are all entities who have a vested interest in the program goal established in work-step 1. Organizational Governance is the entity that funds and will be accountable for achieving the program goal. Typically Organizational Governance entities are also stakeholders.

Facilitators/Analysts facilitate the planning process and develop the analyses needed for the planning process.

Work-steps 1 through 10 are work-steps that involve substantial work by Facilitator/Analysts with stakeholders, capturing stakeholder input and obtaining feedback. Work-steps 11-16 are characterized by substantial analytic work by Facilitator/Analysts. Consultation by Facilitator/Analysts with Organizational Governance is intensive at the RAPP decision work-steps 11, 15 and 16.

The possible outcomes of these decisions are to proceed with, stop or postpone the program.

FIG. 1 also shows the software packages, of the preferred implementation discussed above, next to the work-steps where they would be utilized.

Information Development and Flow for RAPP Work-Steps.

The explanations below explain the method of operation of RAPP.

Information Capture and Generation

FIG. 3 is a From Step/To Step table that shows at which work-steps RAPP generates and captures information as it progresses through its 18 work-steps. Information generated in a work-step will be retained for later reference and will be used as input for the completion of one or more subsequent work-steps. Check marks indicate the subsequent work-steps where information generated by each work-step is utilized. A partial legend for FIG. 3 is provided in FIG. 2.

The information captured or generated will be in three forms as listed in the legend of FIG. 3:
A. Text
B. Data
C. Image The letter F is shown in work-steps where flow decisions are made. Updating privileges vary by class of user and are shown in the right most column of FIG. 3 for each work-step. Information retention RAPP utilizes a hierarchical folder structure as follows:
Program active folder
Program work-step documents folder (1-18)
   Active Text Folder
     Required text
   Active Data Folder
     Required tables
   Active Image Folder
     Required images
   Notes Folder (Optional entries)
     Text, Data, and images
Program History Folder (1 through n)
Program Work-step documents folder (1-18)
   Text Folder
     Required text
   Data Folder
     Required tables
   Image Folder
     Required images
   Notes Folder (Optional entries)
     Text, Data, and images
System controls
Security As shown in FIG. 3, there are only two types of updating privileges. Type 1 for the Backcasting Facilitator is restricted to work-steps 1, 3, 4 and 8. Type 2 for the Analyst has update privileges for all work-steps. Read-only access is provided to all stakeholders by approval of program governance. The system administrator provides passwords accordingly. The default RAPP systems administrator is the RAPP analyst.

Version Control

All text, data and image documents are time stamped upon being saved. Since information flows forward through the RAPP work-steps, the most recent time-stamped required document that precedes any work-step is the active document when walking backwards in time work-step by work-step.

The saving of the required documents for the decision work-steps (work-steps 11 or 15) marks the conclusion of one RAPP planning cycle. At these decision points the RAPP system assigns a unique identifier to that planning cycle to facilitate later retrieval. The design of the identifier character sequence will allow users to trace a program name backwards in time to preceding program identifiers and to the originating program name. That unique identifier is placed in a user accessible table that includes the name of the program and the time stamp of its submission.

No more than one active folder can be generated for a given program name. If users wish to concurrently explore more than one option for the same program they will need to supply a different name e.g. suffixes to a program name. Upon opening a new RAPP planning cycle for a given program name the prior active folders are moved into the Program History folder for that program name.

Over time, the history folder will include entries deemed irrelevant for current analysis. The RAPP system will have facilities to highlight historical entries by program name and time-stamp date so as to focus user attention on relevant information.

User Interface

Upon logging in and acceptance of a password the user is shown a list of active programs and selects the one to work on. Users always begin at work-step 1 and are required to save or resave documents to proceed to a subsequent work-step thereby updating the time stamp. With time-stamping of a work-step, the system prompts the user to launch the next allowable work-step as defined in the work-step sequence shown in FIG. 1. When users log-off contents of the last incomplete work-step are saved and marked as incomplete. Upon logging in the user can also open any historical program history folders for reference and/or to make them active.

Within each work-step the system will launch without user intervention off-the-shelf software products for Simulation (e.g. AnyLogic), Word Processing, (e.g. MS Word), Diagramming (e.g. MS Visio), Spreadsheet analysis (e.g. MS Excel), Project Management (e.g. MS Project), as well as Risk Analysis software products that interface with Spread Sheet and Project Management software (e.g. @Risk for Excel & @Risk for Project) that the work-step requires.

System Operation

The system operation section below describes the origination, generation, capture, form and flows of information at each work-step of RAPP. The explanations below of each work-step in FIG. 1 will further provide those skilled in the art, the method of operation of RAPP.

Work-Step 1: Establish Program Goal

Work-step 1 Description

RAPP is intended for substantial change initiatives in the private and public sector that warrant careful scrutiny before committing to a change program launch. Goals for change initiatives are best illustrated by an example.

In the private sector, Goals might be articulated as follows:

In five years we will have centralized management for our company's current independent business units.

In three years we will have decentralized our company into independent business units that conform to our different markets to ready them for acquisition by competitors.

In three years our company will utilize Lean Six Sigma Continuous Improvement methodologies throughout.

Within four years we will outsource all operations that do not distinguish our enterprise from competitors.

Within three years we will in-source all operations to achieve our customers high quality standards In three years our medical practice will transform from a fee for service business model to a fixed fee per patient business model.

In the public sector Goals might be articulated as follows:

In five years, a Medicare For All single payer system will replace the private insurance industry in the United States.

Within four years, all Detroit owned abandoned property will have been disposed for productive use.

Within three years, all new construction within anticipated 2050 flood zones will be banned in the State of New Jersey.

The articulation of the goal requires the involvement of major stakeholders (both individuals and groups). The specific development of the goal will be accomplished through an interview process with the "organizational actors" as described by Hirschhorn in *Backcasting, A systematic Method for Creating a Picture of the Future and How to Get There*, OD PRACTITIONER, Vol. 39, No. 4, 2007.

Work-Step 1 Computer Systems Implementation

The Goal is captured in textual form and is retained in the work-step 1 Active Text folder.

The information captured at work-step 1 will be utilized in subsequent work-steps 2, 3, 8 and 18 as shown in FIG. 3.

Work-Step 2: Identify General Exogenous Factors

Work-step 2 Description

Exogenous Factors are those factors that will impact a program that are beyond the control of the stakeholders in a program. These factors may be numerous and will often include both factors internal and external to an organization. For example, "access to staff who are both familiar with an organization but require new skill sets" is an internal factor whereas "interest rates" are an external factor.

Generally the organizational actors will be able to select candidate exogenous factors that apply to the program goal from generic lists of factors.

Categories of exogenous risk factors include environmental factors such as climate change, natural disasters, pandemics and pollution and economic risk drivers such as oil pricing, global recession deflation/inflation, rising prices of raw materials and fiscal crises. Categories of exogenous risk factors that are more directly focused on an enterprise could be customer based or competition based such as customers as competitors, innovation from niche vendors, and mergers and acquisitions. Other examples of categories include regulatory compliance and technology risk drivers.

There are numerous sources for risk categories and their specific exogenous factors. Two examples are the FIRM and PESTLE, Risk classification systems as described by Hopkin in *Fundamentals of Risk Management*, 2010, ISBN-13: 978-0-7494-5942-0:

FIRM: Financial, Infrastructure, Reputation and Marketplace Risk Scorecard, FIRM balances external risk (reputation and marketplace) and internal risk (financial and infrastructure).

PESTLE: Political, Economic, Sociological, Technological, Legal, Environmental focuses on external factors and business environments.

Work-Step 2 Computer Systems Implementation

The identification of risk factors is a facilitated elicitation process conducted by the analyst working with stakeholders. At its conclusion, the list of potentially applicable risk factors is captured in textual form to be retained in the work-step 2 Active Text folder. The information captured at work-step 2 will be utilized in subsequent work-steps 5 and 18 as shown in FIG. 3.

Work-Step 3: Develop Backcast

Work-Step 3 Description

Backcasting is a prior art strategic planning methodology developed by Dr. Larry Hirschhorn. Backcasting method details are provided by Hirschhorn in *Backcasting, A systematic Method for Creating a Picture of the Future and How to Get There*, OD PRACTITIONER, Vol. 39, No. 4, 2007. Texts shown within quotation marks in this section are taken from this Hirschhorn document.

"Backcasting consists of four steps,"

1. "Specifying the goal"

"Ask the organizational actor or client specify a desired end state."

2. "Interviewing the organizational actors"

a. "What obstacles would you have to overcome to achieve this result?"

b. "What accomplishments represent the overcoming of these obstacles?""

3. "Creating a draft backcast and its corresponding accomplishments map"

"The interviewer then analyzes the text of the interview and maps it onto the structure" as shown in FIG. 4. FIG. 4 provides a hypothetical example of a draft backcast with three iterations of Obstacles and Accomplishments and an associated numbering convention.

FIG. 5 shows a backcast derived from the Hirschhorn reference that also includes texts that describe the obstacles and accomplishments.

Figure 6:
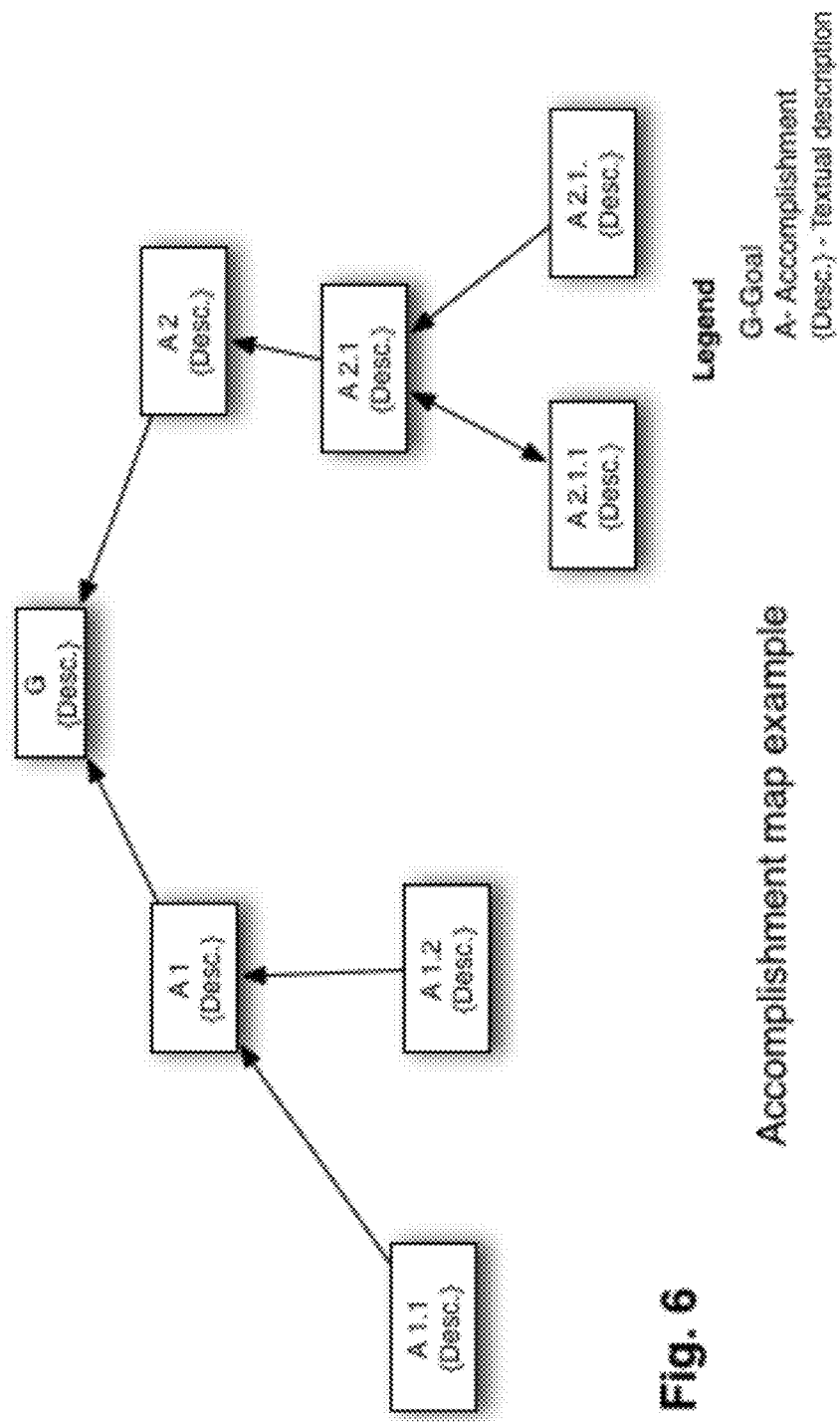
FIG. 6 illustrates an accomplishment map.

"We create an accomplishments map by eliminating all the obstacles." This is illustrated in FIG. 6 for the hypothetical example of FIG. 4.

4. "Creating an Action Plan"

Figure 7:
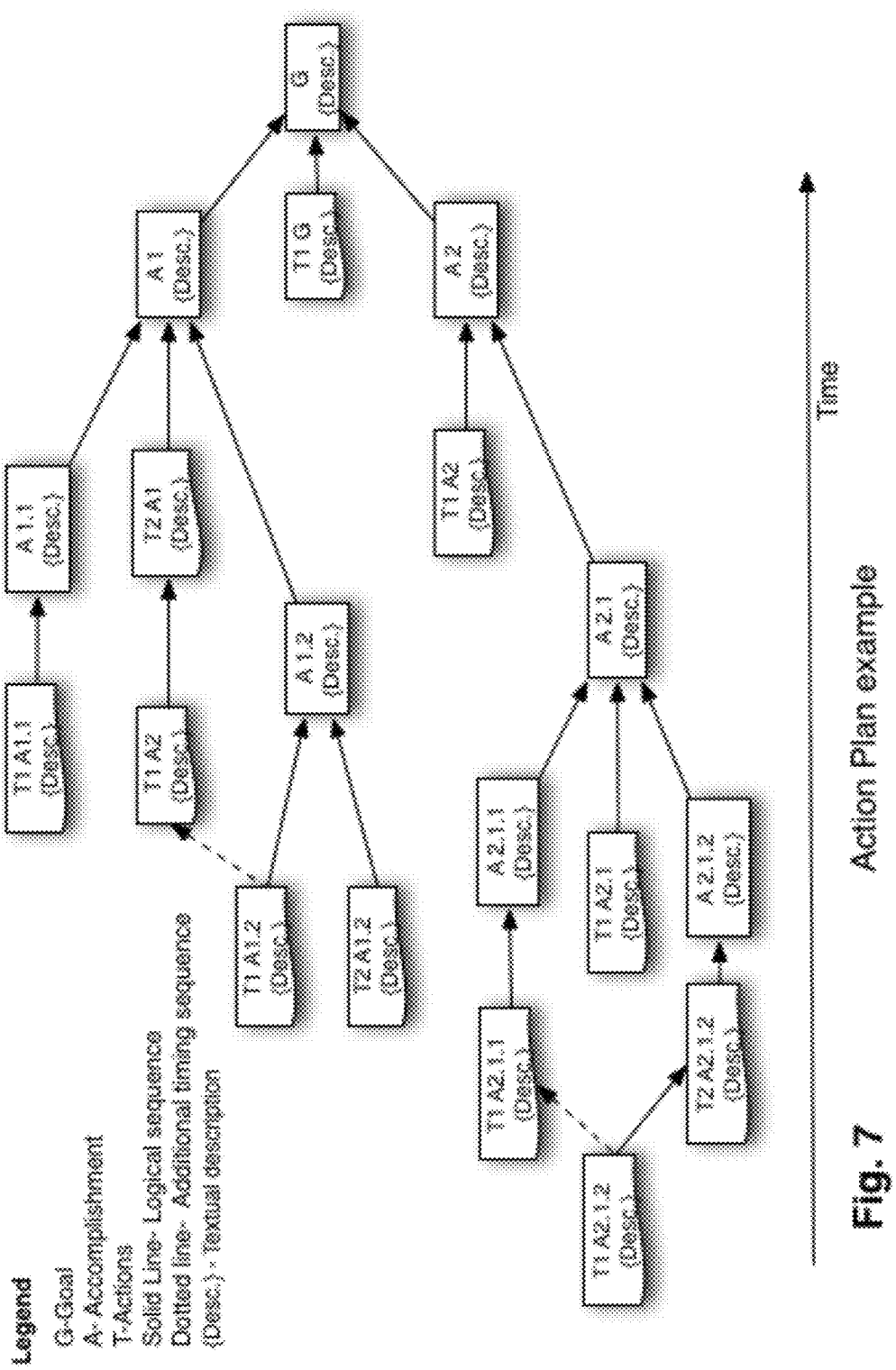
FIG. 7 illustrates an example of an action plan.

The accomplishments map forms the basis of an action plan that identifies and adds sequences of actions that have a temporal relationship to one another. Whereas the logical representation of accomplishments in FIG. 6 is represented in a vertical tree structure the sequential flow of actions to realize these accomplishments over time is represented horizontally as a flow from left to right since the goal is achieved last and therefore is rightmost on the action plan. FIG. 7 shows the accomplishments structure of FIG. 6 rotated 90° in a clockwise direction with actions preceding their associated accomplishments. The actions required to achieve the accomplishments are shown as cut rectangles that are labeled uniquely beginning with the letter T. The relative positions in time of the actions are represented in their relative positions from left to right on FIG. 7. Precedence relations between actions are shown by solid lines when leading to the same accomplishments however there may be additional explicit precedence relations between actions leading to different accomplishments, which are shown by dotted lines.

Figure 8:
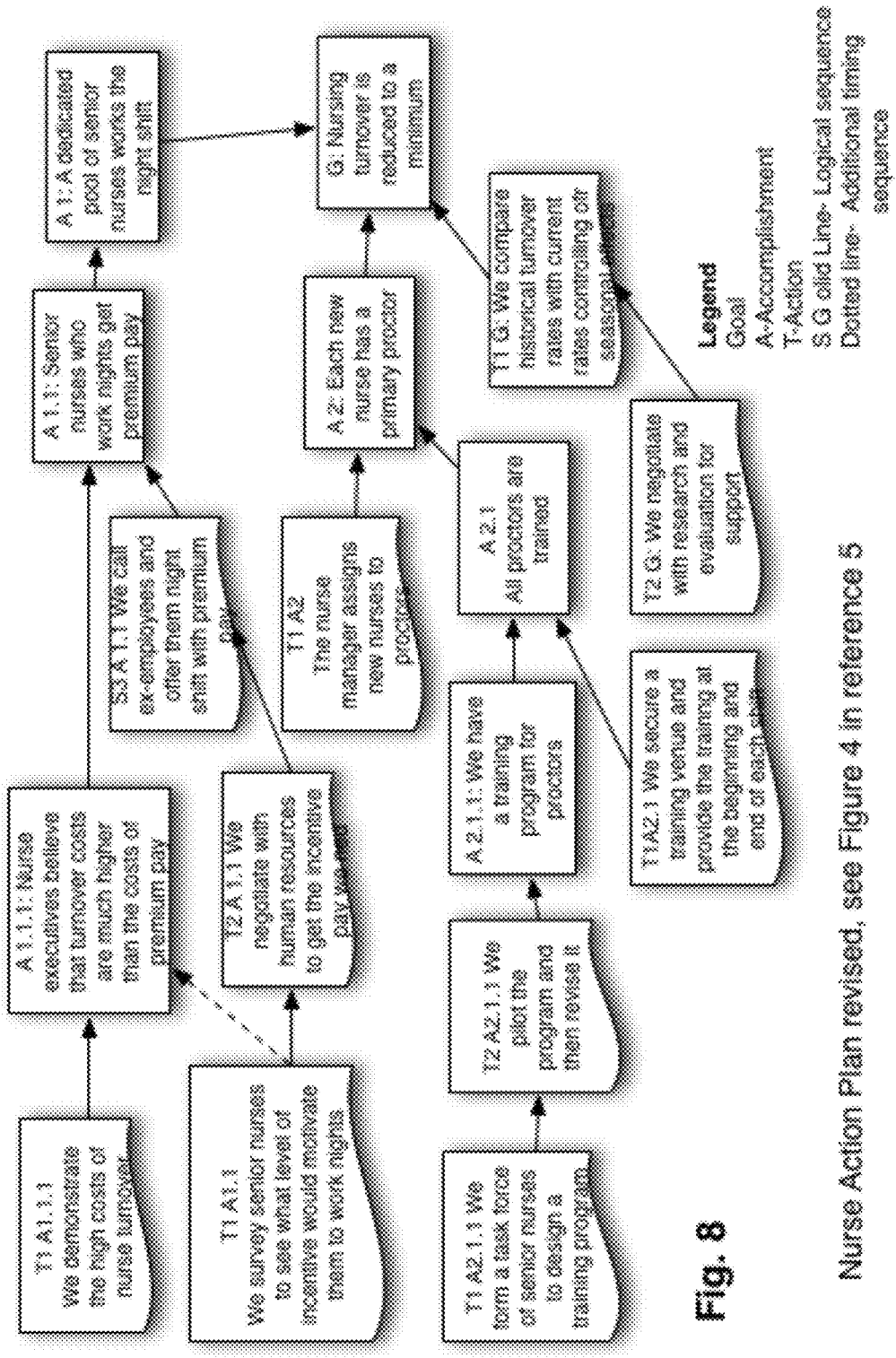
FIG. 8 illustrates the action plan presented by Hirschhorn in *Backcasting, A systematic Method for Creating a Picture of the Future and How to Get There*, OD PRACTITIONER, Vol. 39, No. 4, 2007.

To illustrate an action plan further, FIG. 8 shows the action plan derived from the Hirschhorn reference also including the text that describe the actions and accomplishments.

FIG. 9a is an Activity and Milestone table that captures the outputs of work-steps 3, 4 and 7 in anticipation of the input needs of work-steps 12 & 13. In anticipation of the need to generate an activity network diagram in work-step 12 that conforms to a standard Project Management format (see Project Management Body of Knowledge, Fifth Edition, Project Management Institute, 2013, ISBN-978-1-935589-67-9), nomenclature is changed in that accomplishments become milestones and actions become activities and zero duration Start and Finish milestones are added. Project management software will recognize zero duration activities as milestones.

The first three columns of the Activity and Milestone table are derived from the FIG. 7 action plan described above, with the activity and milestone labels unchanged. In column 1, Activities and Milestones together are numbered in time sequence, moving from left to right on FIG. 7. This is needed for later reference to the RAPP work-steps. In Column 2 of FIG. 9a, the corresponding labels are transcribed from FIG. 7. In column 3, the predecessors to each milestone and activity are captured thereby allowing the Project Management software to reconstruct the structure of FIG. 7 in work-step 12. Finish-to-start dependencies are assumed for all activities.

Figure 10:
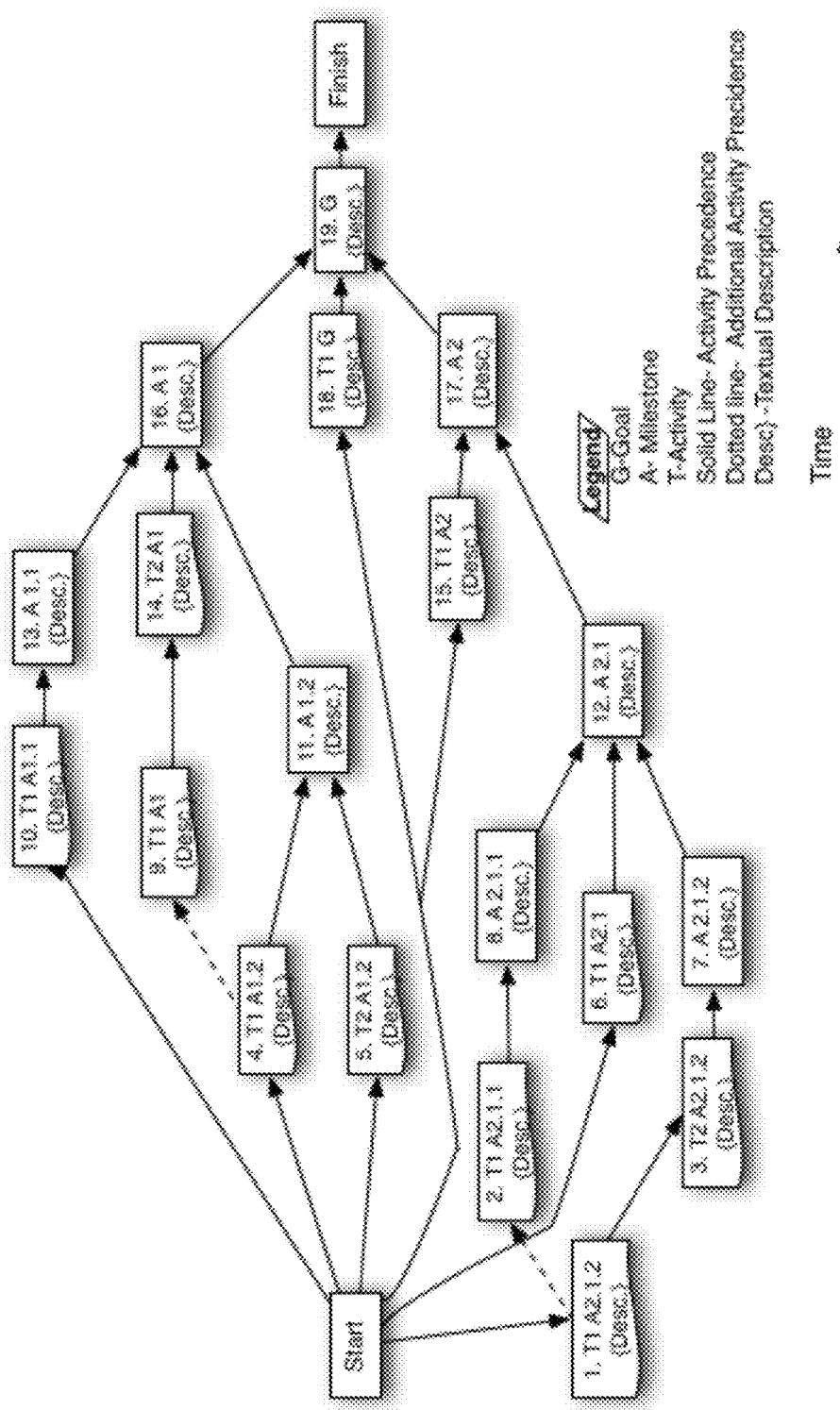
FIG. 10 illustrates for work-step 12 the conversion of the action plan shown in FIG. 7 into an activity network diagram.

FIG. 10 illustrates the incorporation of these changes for FIG. 7.

Work-Step 3 Computer Systems Implementation

The text, data, and image information captured at work-step 3 will be retained in the work-step 3 Active Text, Active Data, and Active Image folders and will be utilized in subsequent work-steps 4, 5, 7 and 18 as shown in FIG. 3.

Work-Step 4: Develop Initial Timeline

Work-Step 4 Description

The action sequence shown in the activity network diagram illustrated in FIG. 10 is placed over a time line that conforms to a consensus opinion of the estimated duration, start and finish of each action and the total program leading to the achievement of the program goal.

Work-Step 4 Computer Systems Implementation

The estimated duration, start and finish of each action transcribed into the non-zero entries of columns 4, 5 and 6 of the table illustrated in FIG. 9a. Of note is the entry in the finish cell in column 4 in which the total estimated duration from Start to Finish is entered.

The backcasting and time-line work-steps are a highly facilitated progressive elicitation process by the backcaster with stakeholders. The elicitation process for work-steps 3 and 4 utilizes diagrams and tables for which examples are provided in FIGS. 4, 5, 6, 7, 8, 9a and 10. However, at the work-step 4 conclusion, only the diagrams and tables illustrated in FIGS. 4, 9a and 10 are captured in the active Data and Image folders for work-steps 3 & 4.

The information captured at work-step 4 will then be utilized in subsequent work-steps 5, 7, 10 and 11 as shown in FIG. 3.

Work-Step 5: Identify Detailed Exogenous Factors

Work-Step 5 Description

Given the list of generic exogenous factors in work-step 2 and an initial timeline for the program derived in work-step 4, applicable exogenous factors are identified. For example, the impact of specific factors such as interest rates or political support may vary over time because of the timing of election cycles or forecasts of fiscal policy. Exogenous factors such as the emergence of competitive technologies will need to be associated more specifically to enterprise products/services and will also vary over time.

Work-Step 5 Computer Systems Implementation

The identification of detailed risk factors continues the facilitated elicitation process of work-step 2 conducted by the analyst working with stakeholders, this time informed by the time line developed in work-step 4. At its conclusion the list of potentially applicable risk factors is reduced to those that will most likely emerge in the time frames developed in work-step 4. Again these factors are captured in textual form to be retained in the work-step 5 Active Text folder.

The information captured at work-step 5 will be utilized in subsequent work-steps 6, 7, 11 and 18 as shown in FIG. 3.

Work-Step 6: Factor Scenario Development

Work-Step 6 Description

Work-step 6 assembles exogenous factors into a scenario narrative for use in subsequent program reviews (work-step 18) to assess whether exogenous factor assumptions have changed and require adjustment. Techniques for generating such scenarios are described in methods for Scenario Planning such as those described by George Wright & George Cairns in *Scenario Thinking, Practical Approaches to the Future*, 2011, ISBN 978-0-230-27156-2. and by Mats Lindgren & Hans Bandhold in *Scenario Planning, the link between future and strategy*, 2003, ISBN-13:978-0-230-57919-4. Scenario Planning concentrates on the external environment for an enterprise. Given typically long planning horizons, several scenarios are developed one of which is selected to form the assumptions for a long-term enterprise strategy. For RAPP with a planning horizon not to exceed six years only one scenario is developed.

Work-Step 6 Computer Systems Implementation

The Factor Scenario will be captured in textual form and will be retained in the work-step 6 Active Text folder. The information captured at work-step 6 will be utilized only in subsequent work-step 18 as shown in FIG. 3.

Work-Step 7: Develop Probability Distributions for Action Durations

Work-Step 7 Description

Each action whose execution is dependent on an exogenous factor may vary in duration. Given the approximate time frame of the action determined in work-step 4, the analyst with input from stakeholders will determine a probability distribution for that action's duration for use in work-steps 10 and 13. A variety of probability distributions and their associated parameters can be used by RAPP to characterize durations, such as those taught by Thomas Hill and Pavel Lewicki in *Statistics Methods and Applications*, ISBN1-884233-59-7, the contents of which are hereby incorporated by reference. Triangular and uniform distributions will be typical choices because they lend themselves to eliciting estimates on randomness from subject matter experts. The choice of probability distribution and the associated parameters is captured in column 7 of the table in FIG. 9a. That completes all of the information needed to conduct work-steps 12 & 13.

Work-Step 7 Computer Systems Implementation

In work-step 7, RAPP will launch Risk analysis software that will make available to the analyst a choice of probability distributions. The analyst will choose the distributions and input their parameters into column 7 of the table illustrated in FIG. 9a.

Work-Step 8: List Benefits

Work-Step 8 Description

The original goal will have been formulated based on a set of presumed benefits. These benefits will have begun with some general ideas by a restricted number of stakeholders about why an investment in a major change initiative may be desirable. Work-step 8 is a more formal process that reaches out to a larger audience of stakeholders at the request by governance that the cost/benefits of such an investment should be explored.

Work-Step 8 Computer Systems Implementation

Data, text and images including summaries of interviews will be captured and entered into the active Notes Folder of the program. The information captured at work-step 8 will be utilized only in subsequent work-steps 9 and 18 as shown in FIG. 3.

Work-Step 9: Research Prior Case Benefits and Costs

Work-Step 9 Description

Prior cases to achieve similar goals may provide benchmarks for benefits. In work-step 9, a literature review as well as professional conference discussions are conducted to surface instances, if any, that would reveal successes or failures and the lessons learned of similar past change initiatives.

Work-Step 9 Computer Systems Implementation

Data, text and images from literature review as well as professional conference discussions will be captured and will be entered into the active Notes Folder of the program. The information captured at work-step 9 will be utilized in subsequent optional simulation and work-steps 10 and 18 as shown in FIG. 3.

Work-Step 10: Monte Carlo Simulation (MCS) Financial Benefit Analysis

Work-Step 10 Description

RAPP supports a preliminary financial justification model based primarily on financial benefits of a program to assess whether even with rough estimates of program costs a program would pass minimum corporate hurdles for Net Present Value (NPV) or Internal Rate of Return (IRR). Program benefits are uncertain and subject to exogenous factors such as market demand, market shares and the emergence of disruptive technologies. Therefore, it is helpful to generate these metrics as random variables with a probability distribution to determine confidence levels for clearing these financial hurdles. The use of MCS is a standard best practice for large capital projects but is not effectively applied to change programs. The novel integration of the backcasting methodology with MCS makes that possible for the first time.

Popular MCS software packages are Oracle Crystal Ball and Palisades @Risk for Excel. MCS software samples probability distributions for all input cells in a spread-sheet to select a set (instance) of inputs with which to compute a single instance of output values. The sampling, calculation, and data capture comprise a single iteration in the MCS analysis. With each iteration, MCS software captures the output value in a histogram for each output cell. The number of iterations required to converge to a stable histogram is highly dependent on the number of cells with probability distributions. Therefore, MCS may require many thousands of iterations, to reach a steady state (reliably calculate) probability distribution for the output cells.

Upon reaching stability MCS software is used to convert the histograms into a probability distribution for each output cell of interest. That probability distribution can be reflected as a discrete distribution that exactly mirrors the histogram or the histogram can be approximated by a continuous distribution that closely resembles it utilizing distribution fitting features. A complete discussion of MCS is provided by Ragsdale in *Spreadsheet Modeling & Decision Analysis*, 2008, ISBN 0-324-65664-5, and is incorporated herein by reference.

Work-Step 10 Computer Systems Implementation

In work-step 10, RAPP conducts MCS at the total program level bypassing any granularity of the activity level. In work-step 14, the granularity of activities is included because a fuller explication of costs will be required. In both simulations the objective is to quantify durations, costs and benefits since those are necessary and sufficient to successfully compute NPV and IRR.

FIG. 9b illustrates the RAPP table that calculates a single computation (instance) for duration, cost, and benefit at the program level. An ISV (Input Single Value) is an entry that remains unchanged for every iteration. So in this illustration the development duration, total development cost, and program duration remain constant throughout the simulation. The development duration in column 1 is obtained from timeline estimates of work-step 4. The total development cost is based on evidence from earlier development efforts of similar scale. The total program duration has been set to the planning horizon that has been standardized for all major capital requests within the enterprise. This process has bypassed Monthly Run-costs and Fixed costs since they are subsumed by the Total development cost. The benefit duration (column 6) is calculated as the program duration (column 5) minus the development duration (column 1). Since both are fixed at a single value the benefit duration is a calculated single value. The Monthly program benefit (column 7) is random variable which means that its value is drawn from an input probability distribution and will change with every iteration. Consequently, since the total program benefit (column 8) is the benefit duration times the monthly program benefit, the total program benefit is a calculated Random variable as opposed to a Random variable that was input into the calculation. Similarly the Financial Metric will also be a calculated Random variable.

This preliminary analysis focuses on benefits and avoids a lengthy investment of time by systems developers for cost estimation. Consequently, this preliminary analysis operates only at the Totals level.

At this point all required information for calculation of financial metrics are in place and the MCS can proceed utilizing a tool like @Risk for Excel which is launched by the RAPP system. Upon completion, the simulation will have generated the financial metric as a random variable with a probability distribution from which one can determine the confidence level for achieving any value of the metric.

Tools such as @Risk for Excel have available many financial functions including NPV and IRR.

The outputs of the simulation, such as the number of iterations the simulation used to generate a stable probability distribution for the financial metric and the values (Data) and shape (image) of the probability distribution as well as any other observations and comments (text), can be stored in the active notes folder. Users launch the MCS software from within RAPP.

Work-Step 11: Sufficient Interest?

Work-Step 11 Description

An analyses is presented to Program Governance for a decision on whether the financial metrics calculated in work-step 10, the timing determined in work-step 4 as well as the exogenous factors identified in work-step 5 are of sufficient interest for continued exploration of the program. If insufficient, immediate consideration of the program ceases.

Work-Step 11 Computer Systems Implementation

The analysis will be captured in textual form and will be retained in the work-step 11 Active Text folder. The management decision will be noted in the active Notes folder in text form.

Work-Step 12: Convert Backcast to Activity Network Diagram

Work-Step 12 Description

In work-step 12, the backcast is converted into an activity network diagram that conforms to a standard Project Management format (see *Project Management Body of Knowledge, Fifth Edition*, Project Management Institute, 2013, ISBN-978-1-935589-67-9). The Activity and Milestone table illustrated in FIG. 9a has sufficient information to generate such a diagram.

Work-Step 12 Computer Systems Implementation

Project Management software can construct Activity Network Diagrams in the three ways.

The first option is with input entered manually, the second from imported tables such as the first 4 columns of the table in FIG. 9a, and the third is input from other project management software through the use of standard interface formats.

FIG. 11 illustrates a Pert Chart Expert that imported the Activity Network Diagram from Microsoft Project after Microsoft Project generated the Activity Network Diagram from tabular inputs like that of FIG. 9a. FIG. 11 shows the action plan of FIG. 8 after capture by the Critical Tools Pert Chart Expert Project Management software package whose value comes from its visualization features that facilitate elicitation from stakeholders. Actions, which are cut rectangles in FIG. 8, become activity rectangles in FIG. 11. Accomplishments, which are rectangles in FIG. 8, become milestones (double line rounded corner rectangles) in FIG. 11. Each activity in FIG. 11 shows the duration, as well as the start-date and end-date. Note that milestones and start and finish activities have zero duration.

For work-step 12 tools for Project Management (e.g. MS Project), Project Visualization (e.g. Pert Chart Expert), and data table management (e.g. Excel) are launched from within RAPP.

Work-Step 13: Monte Carlo Simulation Program Duration (MCSD) Analysis

Work-Step 13 Description

MCSD analysis software such as @Risk for Project is used in conjunction with project management software such as Microsoft Project. Other well-known MCSD software packages that operate with Project Management tools are Oracle Primavera Risk Analysis and Booz Allen Hamilton Polaris. The Risk analysis software samples activity duration probability distributions to select a set (instance) of values that are turned over to the project management software to form a single instance of input values for analysis by the project management software. The project management software then calculates a single value for the total program duration. The risk analysis software then captures that value in a histogram for total program durations. Concurrently, the MCSD analysis can calculate a number of other random variables of interest. The sampling, duration calculation, and duration capture comprise a single iteration in the Monte Carlo analysis.

The risk analysis software can then be used to convert the histogram into a probability distribution for total program duration. That probability distribution can be reflected as a discrete distribution that exactly mirrors the histogram or the histogram can be approximated by a continuous distribution that closely resembles it by utilizing distribution fitting features. The number of iterations required to converge to a stable histogram is highly dependent on the number of activities with probability distributions. Therefore, Monte Carlo simulation may require many thousands of iterations, to reach a steady state (reliably calculate) probability distribution of the total program duration, which is the primary output of work-step 13. MCSD is described by Hulett in *Integrated Cost-Schedule Risk Analysis,* 2011, ISBN 978-0-566-09166-7, the contents of which are incorporated herein by reference.

Work-Step 13 Computer Systems Implementation

In work-step 13, Monte Carlo simulation takes as input the activity duration probability distributions and their parameters developed in work-step 7. These are shown in the last column of the table in FIG. 9a. The expected value of the steady state distribution generated with the MCSD analysis for the total program is captured in the totals row of column 1 of the table illustrated in FIG. 9c. The expected (mean) values for each activity duration can be determined directly from probability distributions and their parameters shown in the last column of the table in FIG. 9a and is captured in column 1 of the Activity Cost-Benefit Estimate Input and calculation table for which an example is shown in FIG. 9c.

For more information, one may refer to the Hulett text, which provides a complete discussion of Project Cost-Schedule Risk analysis including Monte Carlo simulation.

Optional work-step: Dynamic Operational Simulation to identify costs & benefits

Description

Simulation models are abstractions of the real world that allow manipulation of the models to test a variety of external conditions that one cannot create in the real world. Prior to the emergence of computer based simulation models, simulations were limited to physical models such as wind tunnels to test aircraft wing foils. There are three distinct types of general-purpose computer based simulation methods, Discrete Event (DE) Modeling, System Dynamics (SD) and Agent Based (AB) Modeling. Whereas Discrete Event and Systems Dynamics came into use in the 60's and 70's, Agent Based modeling came into wide spread use in the 1990's. These are three very distinct approaches to modeling that tend to be used for different purposes and typically use different software packages. The release of AnyLogic in 2000 combined these methods into a single software product facilitating the development of multi method hybrid models typically used and that have distinct advantages over single method models for simulating large change programs (see *The Big Book of Simulation*, Andrei Borshchev, 2013, ISBN 13: 978-0-9895731-7-7).

To better understand if the desired goal in work-step 1 (the to-be outcome) is, in fact, worthwhile or even desirable we may need to model the desired outcome at the end of the program and even during the transition period. Such a model may also expose unintended consequences of the outcomes and/or the transition from the current as-is situation. Additionally, simulation of the as-is situation helps assure that the current condition is well understood and validated by historical data so that the as-is and the to-be conditions can be differentiated concretely with operational metrics (e.g. service levels, throughputs, activity based costing). The simulation model can be used to convert dynamic operational metrics (e.g. service levels, throughputs) into static financial metrics (period costs and revenues).

Computer Systems Implementation

Dynamic Operational Simulation to identify benefits and cost inputs for RAPP is optional because it involves very substantial specialty skills for model building and analysis as well as a substantial increase in the time, effort and planning budget allocation for the program go/no-go decision. Integration of Dynamic Operational simulation into RAPP is limited to the launch of the simulation software from the RAPP environment and the ability to upload to the active Program Notes folder data useful to construct entries into the Activity Cost-Benefit Estimate Input and calculation table generated in work-step 14. The Borshchev reference provides a complete discussion of operational simulation modeling and is incorporated herein by reference.

Work-Step 14: Monte Carlo Simulation (MCS) Financial Cost/Benefit Analysis

With the completion of work-step 13 and possibly the optional Dynamic Simulation, more information is available regarding specific activity costs that can be included in an overall financial justification model. These costs will replace any cost estimates utilized in work-step 10 to permit more realistic calculations of key financial metrics such as NPV and IRR. Bierman and Smidt in *The Capital Budgeting Decision, Ninth Edition,* 2007, ISBN13: 978-0-415-40003-9 provide a complete discussion of capital investment financial modeling and is incorporated herein by reference. The preliminary financial justification model was useful based solely on presumed financial benefits of the program to assess whether even with very rough estimates of program costs a program would pass minimum corporate financial hurdles.

Work-Step 14 Computer Systems Implementation

Work-step 14 first prepares for the Monte Carlo simulation by populating the empty cells of the table illustrated in FIG. 9c. Column 1 is now populated from the duration simulation of work-step 13 described above. Monthly run-costs and fixed-costs are sampled from their probability distributions which are based on the experience of stakeholders and prior case reviews of work-step 9 or from the optional dynamic simulation if available. Those entries at the activity level will be inserted into columns 2 and 3 of the table in FIG. 9c. Column 4 contains the total cost of each activity which is the product of the entries in columns 1 and 2 plus the fixed cost in column 3. The total cost of development is the sum of the individual activities and is shown in the totals row of column 4. For columns 5, 6, 7 and 8, of FIG. 9c, benefits are assumed to accumulate over time for the entirety of the program so benefit entries appear only in the totals row. In column 5, the total program duration has been set to a planning horizon that has been standardized for all major capital requests within the enterprise. The benefit duration in Column 6 equals the Program Duration minus the Development Duration in Column 1 on the presumption that benefits are not realized before development is complete. Those skilled in the art will also appreciate that an indefinite number of more complex assumptions can be modeled, for example if partial benefits can be realized while program development is still underway.

Program benefits continue to be uncertain and subject to exogenous factors such as market demand, market shares and the emergence of disruptive technologies. Monthly benefits in column 7 will have the same probability distribution used in work-step 10 unless more has been learned about benefits by other means such as the optional dynamic simulation. The total program benefit in column 8 is the product of the program benefit duration and the program monthly benefit.

At this point all required information for calculation of financial metrics are in place and the MCS can proceed utilizing a tool like @Risk for Excel which will be launched by the RAPP system. Upon completion, the simulation will have generated the financial metric (IRR, NPV) as a random variable with a probability distribution and its parameters from which one can determine the confidence level for achieving any value of the metric. The table will then be retained in the work-step 14 Active Data folder.

The outputs of the simulation such as the number of iterations the simulation used to generate a stable probability distribution for the financial metric and the values (Data) of the shape (image) of the probability distribution as well as any other observations and comments (text) can be stored in the active notes folder. MCS software tools have Sensitivity Analysis features. Sensitivity Analysis ranks the impact of all the random variables on the output distribution of the financial metric that will be useful in work-step 16.

Work-Step 15: Acceptable Risk Decision

Work-Step 15 Description

The work-step 14 analysis is presented to Program Governance for a decision to launch/continue, postpone or stop the program. If the risks are deemed acceptable the decision is to proceed.

The post program-planning phase follows and is discussed below in work-step 17. If the risk judgment is unclear (a maybe) postponement for further study is explored in work-step 16. If the risks are not acceptable, the program is stopped.

Work-Step 15 Computer Systems Implementation

The analysis is captured in textual form and is retained in the work-step 15 Active Text folder.

The management decision is noted in the active Notes folder in text form.

Work-Step 16: Postpone Decision and Possibly Invest in Further Analysis

Work-Step 16 Description

In work-step 16, the user explores whether any reasonable adjustments to the probability distributions and/or their parameters assigned to activities in work-step 13 could result in acceptable risk. Using the sensitivity analysis features on the outputs of the risk management software will provide a priority sequence for adjustments to the input distribution functions and their parameters. These adjustments are made in work-step 7 thereby impacting the MCS in work-steps 10, 13 and 14. Determination of what adjustments might be reasonable is a joint decision by analysts and domain experts. The MCS analysis of work-steps 10, 13 & 14 would then be repeated to generate a new risk assessment for consideration by program governance. For each grouping of adjustments the analyst would launch a new RAPP cycle which returns the analyst to work-step 1. The analyst would then skip to work-step 7 by time stamping work-steps 1 through 6 from an earlier cycle.

Additionally, more refined analysis of historical data and/or the generation of new survey data may also reduce uncertainty of estimates of durations, costs and benefits thereby strengthening confidence in go/no-go program decisions.

Work-Step 16 Computer Systems Implementation

Unstructured notes describing the additional analyses conducted and subsequent decisions will be captured in textual form and will be retained in the work-step 16 Active Notes folder. These notes will reference the additional RAPP cycles spawned in work-step 16 and the corresponding RAPP cycle number. The information captured at work-step 16 will be utilized in work-step 18, subsequent program reviews as shown in FIG. 3.

Work-Step 17: Operational Project Management

Work-Step 17 Description

Operational project management requires the allocation of resources to execute the activities defined in the program plan that is developed in work-step 12. Whereas the program activities can still be articulated as "outcomes" the generation of "deliverables" to achieve those outcomes requires significantly added granularity. That granularity is provided through a planning mechanism called a Work Breakdown Structure (WBS) as described in *Project Management Body of Knowledge*, Fifth Edition, Project Management Institute, 2013, ISBN-978-1-935589-67-9.

A WBS is a tree structure. Each program activity is the top of a WBS tree and is successively subdivided it into manageable components in terms of effort, schedules, cost and resource allocation.

By using the same software tool for both program planning (RAPP) and operational project management, a seamless analytical transition between the two processes is established. Preparation for major RAPP reviews is also facilitated by this seamless transition because program status can be analyzed by rolling up task status to the top of the WBS trees.

Work-Step 17 Computer Systems Implementation

Operational Project Management has no direct responsibilities for maintenance of RAPP folders, but will be generating its own periodic project status reports for operational management in separate folders.

Work-Step 18: Subsequent Major Program Reviews

Work-Step 18 Description

Major program reviews begin in work-step 18 consistent with an enterprise planning and budgeting cycles (typically annually). If go/no-go decisions will be made for continuation of a program, reviews are initiated within RAPP by a RAPP analyst. Major reviews are most typically collaborations between the facilitator analysts and program governance with participation by stakeholders only as needed. Major reviews may skip or shorten RAPP work-steps beginning at work-step 1 depending on the amount of new information collected by the operational system. The analyst will review the RAPP folders that concluded with the prior go/no-go decisions for the program. The analyst also will review the operational project status reports (typically issued monthly or quarterly). The analyst will interview operational project managers to determine what major changes have occurred regarding assumptions of the prior program go/no-go decision particularly the exogenous factors impacting the program. Based on these reviews and interviews the analyst develops a RAPP work plan for approval by governance.

Work-Step 18 Computer Systems Implementation

To begin the program review the analyst launches a new program. The RAPP analyst will be given access to the Operational Project Management System. He or she will generate roll ups to the program level of the operational information and copy that information into the active notes folder of the new program. The analyst will highlight information from the History Folders that would be relevant for the major program review.

Alternative Embodiments

There are a number of advanced features found in Project Risk simulation Software for characterizing exogenous factors beyond assigning probability distributions to activity durations that can be incorporated into work-steps 13 & 14 of RAPP. These include among others features, Probabilistic Branching and IF/THEN Conditional Branching. Probabilistic branching lets a program branch from one activity to one or more other activities during simulation, where the branch selected conforms to a preset probability. For example, if the likelihood of acquisition of the organization by a competitor is 30%, 30% of the iterations will branch to an alternative set of contingency activities.

With IF/THEN Conditional Branching, if a pre-defined condition occurs for a particular activity during the iterations of the simulation, the activity value will change or a branch to another activity will be taken. For example, the freezing of the polar ice cap might delay the deployment of offshore drilling platforms. So if the projected construction dates fell outside an allowable calendar window, construction would be postponed until the window reopened.

Some go/no go decisions for programs will benefit from multiple RAPP analyses in cases where exogenous factors are highly discrete such as results of elections, declarations of war or acquisition of companies. In those instances, each combination of these highly discrete factors would be assumed for a RAPP analysis and entered into a decision tree to which probabilities can be assigned to each branch of a decision flow diagram, as described by Raiffa in *Decision Analysis, Introductory lectures on Choices under Uncertainty*, Addison-Wesley, 1968.

Some go/no go decisions for programs will benefit from multiple RAPP analyses that are layered when a number of specifically targeted backcasting goals serve a more general backcasting goal. An example would be a manufacturer whose goal is to enter the transportation space but must then decide whether to start with passenger automobiles, commercial trucking or space vehicles.

RAPP also can be applied retrospectively to programs that are already established and where major extensions to those programs are being considered. This utilization of RAPP can be viewed as learning from past experience to increase the odds for success in the future. Retrospective RAPP analyses can be extended to programs that are industry or product/service specific.

Those skilled in the art will also appreciate that numerous other modifications to the invention and numerous other applications for "program management" products are possible within the scope of the invention. Accordingly, the scope of the invention is not intended to be limited to the exemplary embodiments described above, but only by the appended claims.

What is claimed:

1. A method for planning programs having several year planning horizons to generate go/no-go decisions to launch, continue, or change such programs, comprising:
 a computer readable device including instructions that, when processed enable using backcasting to solicit input from stakeholders to identify,
 a. program goals,
 b. given the program goals as input determine and record obstacles to achieving the program goals,
 c. given the obstacles to program goals as input determine and record accomplishments to overcome obstacles to the program goals
 d. given accomplishments that overcome obstacles as inputs determine and record successive obstacles and accomplishments until no obstacles remain, resulting in a tree representation with the program goal as the root and accomplishments as subordinate branches, and
 e. given the accomplishments determine and record the actions required to realize each of the accomplishments for the program;
 f. generating an activity in an activity network diagram for each action;
 g. generating a milestone in an activity network diagram for each accomplishment;
 h. soliciting input from stakeholders for estimating the durations of the actions, where the durations are treated as random variables with probability distributions based on a determination of exogenous factors and influences that impact action durations;
 i. performing Monte Carlo simulations for durations of the activity network diagram as well as costs and benefits that are also treated as random variables in order to generate quantitative financial metrics that are random variables with probability distributions;
 j. processing the metrics to determine confidence levels for performance levels; and
 k. generating a go/no-go decision for the program based on the confidence levels.

2. The planning method of claim 1, wherein the backcasting results in an action sequence required to complete each accomplishment of the program.

3. The planning method of claim 1, further comprising soliciting input from stakeholders to identify and record the factors that may influence the duration of each activity of the program.

4. The planning method of claim 3, wherein soliciting input from stakeholders includes identifying and recording the probability distributions and the parameters of each of the factors that may influence the duration and costs of each activity of the program.

5. The planning method of claim 3, wherein soliciting input from stakeholders includes estimating and recording the development costs of each activity of the program.

6. The planning method of claim 3, wherein soliciting input from stakeholders includes estimating and recording the benefits of the program.

7. The planning method of claim 1, further comprising soliciting input from stakeholders for use in identifying probability distributions for activity durations.

8. The planning method of claim 7, wherein performing Monte Carlo simulations comprises performing a Monte Carlo simulation on the activity network diagram utilizing the probability distributions for activity durations to compute a probability distribution for a duration of the entire program.

9. The planning method of claim 8, wherein performing Monte Carlo simulations comprises performing a financial Monte Carlo simulation on cost and benefits of the program utilizing the probability distribution for the duration of the entire program, each step of the activity sequence, and other costs and benefits unrelated to duration to compute a probability distribution for Internal Rate of Return (IRR) and Net Present Value (NPV).

10. The planning method of claim 1, further comprising converting activities and milestones into an activity network diagram format that is recognized by project management and project risk management software.

11. The planning method of claim 1, wherein generating the go/no-go decision comprises determining whether the program should proceed, be postponed for future consideration, or be cancelled.

12. A computer readable storage device for planning programs having several year planning horizons to generate go/no-go decisions to launch, continue, or change such programs, the storage device bearing computer-readable instructions that, when executed on a computer, cause the computer to perform operations comprising:
 using backcasting to solicit input from stakeholders to identify
 a. program goals that are input to the device by a user,
 b. the user taking as output from the device the program goals, determines and records as input to the device, obstacles, to achieving the program goals,
 c. the user taking as output from the device the obstacles to program goals, determines and records as input to the device, accomplishments to overcome obstacles to the program goals,
 d. the user taking as output from the device accomplishments that overcome obstacles determines and records as input to the device, successive obstacles and accomplishments until no obstacles remain, resulting in a tree representation, with the program goal as the root and accomplishments as subordinate branches, and
 e. the user taking as output from the device the accomplishments determines and records, as input to the device, the actions required to realize each of the accomplishments for the program;
 f. the user taking as output from the device all actions, generating an activity in an activity network diagram for each action to be input to the device;
 g. the user taking as output from the device all accomplishments, generating a milestone in an activity network diagram for each accomplishment to be input to the device;
 h. soliciting input from stakeholders for estimating the durations of the actions, where the durations are treated as random variables with probability distributions based on a determination of exogenous factors and influences that impact action durations to be input to the device by the user;

i. the user performing Monte Carlo simulations on the device for durations of the activity network diagram as well as costs and benefits that are also treated as random variables in order to generate quantitative financial metrics that are random variables with probability distributions;

j. processing the metrics to determine confidence levels for performance levels; and k. generating a go/no-go decision for the program based on the confidence levels.

13. The device of claim 12, further comprising instructions that, when processed, cause the computer to solicit input from stakeholders for use in calculating probability distributions for activity and total program durations.

14. The device of claim 13, further comprising instructions that, when processed, cause the computer to perform a Monte Carlo simulation on the activity network diagram utilizing the probability distributions for activity and total program durations to compute a probability distribution for a duration of the entire program and each step of an activity sequence.

15. The device of claim 14, further comprising instructions that, when processed, cause the computer to perform a financial Monte Carlo simulation on cost and benefits of the program utilizing the probability distribution for the duration of the entire program, each step of the activity sequence, and other costs and benefits unrelated to duration to compute a probability distribution for Internal Rate of Return (IRR) and Net Present Value (NPV).

16. The device of claim 12, further comprising instructions that, when processed, cause the computer to convert activities and milestones into an activity network diagram format that is recognized by project management and project risk management software.

17. The device of claim 12, further comprising instructions that, when processed, cause the computer to determine whether the program should proceed, be postponed for future consideration, or be cancelled.

18. The device of claim 12, further comprising instructions that, when processed allow additional granularity to be added to the activity network diagram to generate the project activity network diagram that facilitates Operational Project Management at task levels to which resources and schedules can be assigned to the tasks that comprise the program activities.

19. The device of claim 18, further comprising instructions that, when processed allows the reduction of granularity of the activity network diagram to a program level to facilitate program level reviews.

* * * * *